United States Patent
Mead et al.

[19]

[11] Patent Number: 6,088,058
[45] Date of Patent: Jul. 11, 2000

[54] CAPACITIVE COUPLED BIPOLAR ACTIVE PIXEL IMAGER HAVING OVERFLOW PROTECTION AND ELECTRONIC SHUTTER

[75] Inventors: Carver A. Mead, Woodside; Tobi Delbruck, Pasadena; Min-hwa Chi, Palo Alto, all of Calif.

[73] Assignee: Foveon, Inc., Santa Clara, Calif.

[21] Appl. No.: 08/865,569

[22] Filed: May 29, 1997

[51] Int. Cl.$^7$ .......................... H04N 3/14; H04N 9/083; H04N 5/335; G03B 7/00
[52] U.S. Cl. .......................... 348/296; 348/362; 257/291
[58] Field of Search .................................. 348/296, 297, 348/298, 299, 362, 314; 257/229, 230, 291, 443; 250/208.1

[56] References Cited

U.S. PATENT DOCUMENTS

| | | | |
|---|---|---|---|
| 4,496,980 | 1/1985 | Pfleiderer ................................. | 348/297 |
| 4,626,916 | 12/1986 | Mizoguchi et al. .................... | 348/307 |
| 4,876,534 | 10/1989 | Mead et al. ........................ | 340/825.95 |
| 5,097,305 | 3/1992 | Mead et al. ............................ | 257/443 |
| 5,260,592 | 11/1993 | Mead et al. ............................ | 257/291 |
| 5,276,407 | 1/1994 | Mead et al. ............................ | 330/308 |
| 5,276,521 | 1/1994 | Mori ....................................... | 348/297 |
| 5,289,023 | 2/1994 | Mead ..................................... | 257/291 |
| 5,324,958 | 6/1994 | Mead et al. ............................. | 257/291 |

OTHER PUBLICATIONS

Theuwissen, A., "Solid–State Imaging for Television Applications," *Solid–State Imaging with Charge–Coupled Devices*, Chapter 6, pp. 176–191 (1995).

*Primary Examiner*—Wendy Garber
*Assistant Examiner*—Alicia M. Harrington
*Attorney, Agent, or Firm*—Limbach & Limbach LLP

[57] ABSTRACT

An imaging array having overflow protection and electronic shuttering features is realized without an increase in pixel complexity. Overflow protection is provided by pulsing each row of the imager with a small overflow pulse during the sense amplifier reset phase. An electronic shutter is realized using a modified version of the pixel readout timing. The shutter provides sub-frame exposure by restricting the number of line-times a pixel is allowed to integrate. For a full-frame exposure, each pixel is read out once per frame; during readout of the other rows of the array, the pixel integrates. For subframe exposure, the pixel is continually reset, using a shutter pulse applied to the row lines during sense amplifier reset, until a certain number of rows (line-times) before it is to be read out. The pixel then is allowed to integrate until it is read out normally.

17 Claims, 8 Drawing Sheets

CAPACITIVE COUPLED BIPOLAR ACTIVE PIXEL IMAGER HAVING OVERFLOW PROTECTION AND ELECTRONIC SHUTTER

TECHNICAL FIELD

The present invention is directed to active pixel imagers, and more specifically, to a capacitive coupled bipolar active pixel based imager having overflow protection and electronic shuttering features.

BACKGROUND OF THE INVENTION

Bipolar transistors are currently used as sensor elements in imaging arrays. Each transistor can be used both as an integrating photosensor and as a select device to read out the integrated charge. The phototransistor sensor produces an output (photo)current as a result of absorbing photons, with the output current being proportional to the intensity of light incident on the sensor. Photons absorbed in the area of a phototransistor collector-base or emitter-base junction produce electron-hole pairs that are collected by a nearby p-n junction. Minority carriers collected by either junction act as a base current and are multiplied by the transistor gain to produce the collector current. The emitter current is the sum of the base current and collector current, and is usually used as the output of the sensor.

Figure 1:
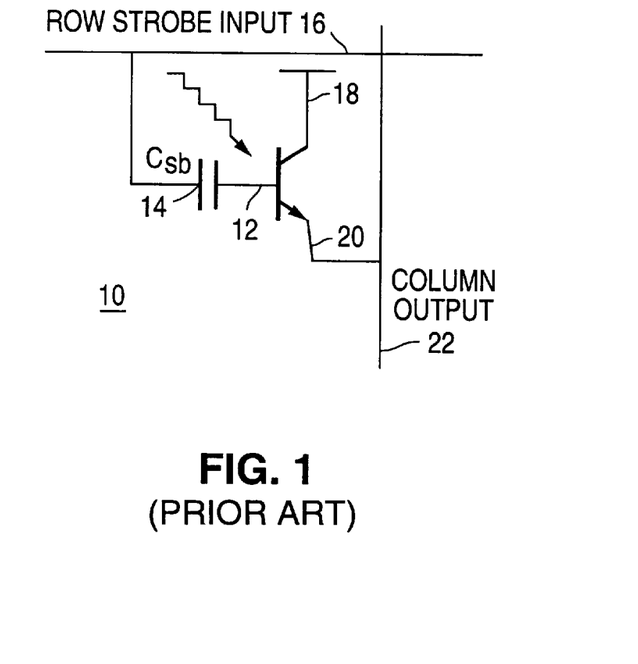
FIG. 1 is a schematic diagram of a pixel based on a vertical NPN bipolar transistor which may be used in an imaging array.

FIG. 1 is a schematic diagram of a pixel 10 based on a vertical NPN bipolar transistor which may be used in an imaging array. It is noted that although FIG. 1 shows a pixel based on an NPN type phototransistor, a corresponding PNP type phototransistor may be used as a pixel by interchanging the n-type and p-type regions of the transistor and reversing the polarities of the associated voltages. Pixel 10 has a floating base 12 which is capacitively coupled through capacitor 14 to a common row line 16 (labelled "row strobe input") it shares with other pixels in a row of the array. Collector 18 of pixel is connected to all of the pixels in the array through a common substrate. Emitter 20 of pixel is connected to a common column line 22 (labelled "column output") which it shares with other pixels in a column.

An important feature of pixel 10 of FIG. 1 is that the integrating node, base 12, is "floating". The use of capacitive coupling between row select line 16 and base node 12 means that there is no direct electrical connection between the base and a potential source, i.e., a connection without an intervening energy barrier. Such a pixel design is desirable because it requires fewer processing steps than do pixels having a direct connection.

During the operation of phototransistor 10, row select line 16 is held at a fixed voltage which is chosen to reverse bias the base-emitter junction of phototransistor 10. As image photons impact the phototransistor, electrons and holes are generated. The photo-generated electrons are swept into n-type collector 18 and removed through the collector voltage line ($V_{cc}$). The photo-generated holes accumulate in the p-type base region and produce an increase in the base potential. The photocurrent generated integrates on capacitor 14 which is formed as part of the structure of the phototransistor. This corresponds to an image storage operation. When it is desired to read out the stored image contained in the imaging element represented by phototransistor 10, row select line 16 is brought to a high value. The readout pulse, termed a row strobe pulse, is capacitively coupled to base 12 of pixel 10 by capacitor 14. The pulse causes a forward biasing of the base-emitter junction of the transistor. In this situation, the integrated photocurrent, multiplied by the current gain of phototransistor 10 flows from the emitter region to column sense line 22.

Each column line is connected to a charge sense amplifier which senses the charge dumped onto each column line during a sensing cycle. The charges for each column of the array are sensed in parallel by the sense amplifiers at the bottom of each column. The sensing operation typically uses both a sense amplifier and a second amplifier which performs a correlated double sampling to compute the difference in the sense amplifier output prior to and after strobing the charge out of the pixel. This acts to remove charge fluctuation on the column line (the kTC thermal charge noise component) during reset of the sense amplifier which might otherwise contribute to the readout signal. After sensing of the charge, the signal is input to a sample and hold stage which drives a video scanout stage.

Readout of an array of such pixels occurs row by row; while a row is strobed and its pixels' charge output is sensed by the column charge sense circuits, the previous row's already sampled sense amplifier outputs are serially scanned out of the imager array by sequentially sensing the currents produced by the video output stages of the column circuits. The output transistors at the bottom of the columns of the array are turned on sequentially by a horizontal shift register circuit that shifts a single bit along the bottom of the array. The bit acts to turn on the video output transistor of each column one by one.

Figure 2:
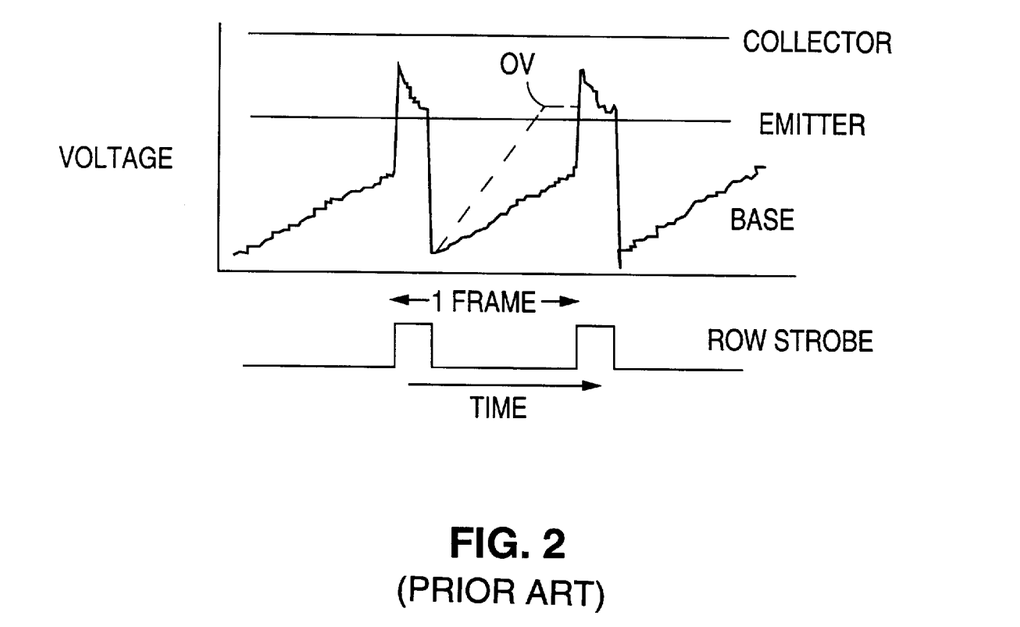
FIG. 2 is a graph of voltage versus time showing the pixel dynamics of the pixel of FIG. 1 during a cycle of the row strobe pulse.

As noted, the integrated charge (the amount stored in the base region since the previous readout cycle) for each pixel in a row is dumped onto a corresponding column line by strobing the row select line momentarily high. This capacitively couples the high-going pulse into the base, raising the base potential and forward-biasing the base-emitter junction. The forward biasing turns on the base-emitter junction, dumping integrated base charge onto the emitter (column output) line. The strobe signal is generated during the sense phase of the column charge sense amplifier and is routed to a particular row by a vertical scan circuit. FIG. 2 is a graph of voltage versus time showing the pixel dynamics of the pixel of FIG. 1 during a cycle of the row strobe pulse. The figure shows the collector, emitter and base nodes' voltage as a function of time during the row strobe cycle. As is evident from the figure, when the row strobe is pulsed high, the base voltage becomes greater than the emitter and the base-emitter junction becomes forward biased.

The sequence of events and control signals used to perform a readout cycle of a selected row of the array is as follows:

(1) reset the sense amplifier(s);
(2) enable the sense amplifier(s) to start the sense phase of the amplifier(s);
(3) enable the strobe (readout) pulse pathway to the selected row;
(4) pulse the row strobe line to the selected row, dumping the integrated charge and resetting the pixels in the row;
(5) each pixel in the selected row dumps its integrated charge to its corresponding column line and associated sense amplifier;
(6) sense the dumped charge, generating a sensed charge signal;
(7) transfer the sensed charge signal from the sense amplifier(s) to the sample and hold stage;
(8) sequentially clock the charge signals out of the array column by column; and
(9) repeat process for the next row.

Note that sequential clocking of the charge signals out of the array column by column occurs concurrently with the listed steps, except for the sample and hold step. Serial readout of a row's output starts just after application of the sample and hold pulse and is completed just before the next sample and hold pulse.

An image is captured by the imager during a time period referred to as a "frame". During the frame period, all of the pixels contained in the array are exposed to the image and integrate the charge generated by the phototransistors which are part of the pixels. Thus, every row of the array has an integration period approximately equal to the frame time. Each row of pixels is read out once per frame. The portion of the image contained in one row of the array is referred to as a "line" and the time period during which the charge from a row of pixels is readout is termed a "line-time".

Figure 3:
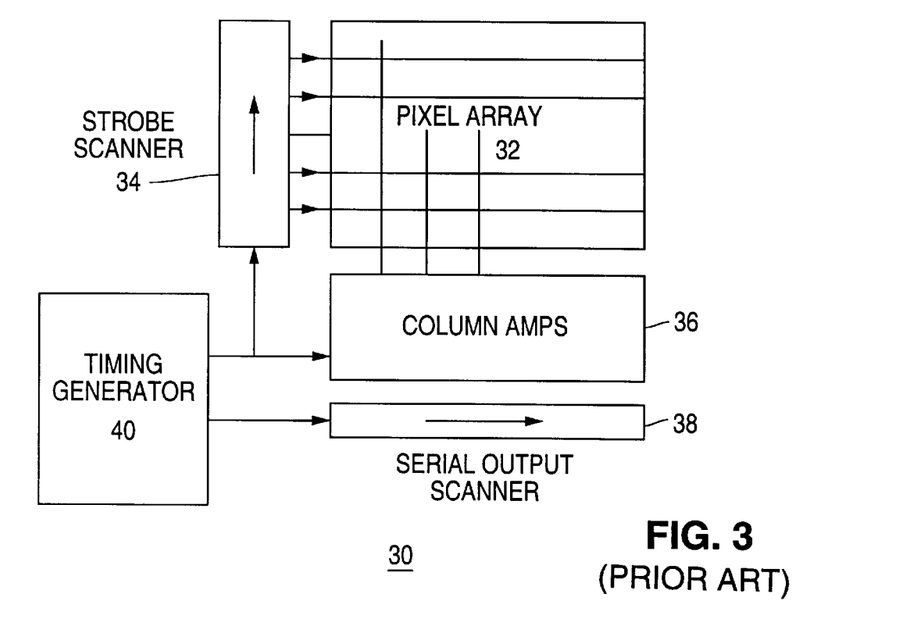
FIG. 3 is a block diagram showing the layout of an imager based on the pixel of FIG. 1.

FIG. 3 is a block diagram showing the layout of an imager 30 based on the pixel of FIG. 1. Imager 30 includes a pixel array 32 formed from a plurality of pixels which are arranged into rows and columns. Strobe scanner 34 is used to select the row of array 32 to which the strobe or row select pulse is applied. Strobe scanner 34 is typically implemented in the form of a vertical scan circuit such as a dynamic shift register, in which a control signal input to the scanner determines to which row the strobe pulse is applied.

A column charge sense amplifier 36 is connected to each of the columns of array 32 and serves to sense the amount of charge dumped onto each column line during readout of a row of the array. The column charges are sensed in parallel by the amplifiers at the bottom of each column. After sensing, the results are sampled and held for each column. While a row of pixels is being sensed, the previous row's charge signals are scanned out serially under the control of serial output scanner 38, which typically takes the form of a dynamic shift register. Timing generator 40 generates the timing (control) signals used to control the operation of strobe scanner 34, output scanner 38, and column amplifiers 36.

Although an imager formed from the pixel of FIG. 1 has many advantageous features, it does have disadvantages. Reflections from specular surfaces (e.g., water, metal, glass) of bright sources such as sunlight can cause image highlights that are more than two decades brighter than the average image luminance. In addition, luminant sources (like light bulbs) themselves are generally several decades brighter than the scene as a whole. In order to provide practical images, imaging arrays must be able to handle these highlights, without becoming over- exposed and generating artifacts.

When a strong image (intense light) is incident on an imaging element formed from a transistor of the type shown in FIG. 1, the base potential increases rapidly during the integration period due to the photo-generated charge, until the base-emitter junction becomes slightly forward biased. Further charge collected in the base region during the integration period is injected into the emitter. This is termed "overflow", and causes a bright vertical streak in the image as the overflowing pixel continuously dumps current onto the column line, including during the column sense amplifier sense phases for other rows being read out. This behavior is indicated by the dotted line in FIG. 2 labelled "ov". Overflow contributes to a degradation of the image quality in cases of images with bright highlights. This reduces the utility of such photosensors for obtaining images in situations of bright (intense) light or scenes with extreme contrast.

In CCD based imagers, the overflow problem is typically addressed using an overflow drain or by using a clocking mechanism which causes recombination of excess photocharge. An overflow drain is a lateral or vertical feature of the pixel which is set to a potential less than the capacity potential of the pixel. It forms a location to which excess charge is preferentially spilled instead of being transferred to another pixel (or in the case of active pixel imagers to a column sense line).

The clocking mechanism approach to overflow control uses a charge pump to insure that a sufficient supply of holes are available for the excess photogenerated electrons to recombine with prior to interfering with the image being captured by adjacent pixels. Charge-pumped overflow protection (termed anti-blooming) can be implemented in frame transfer CCD imagers that have buried n-channel structure. Anti-blooming is provided by holes trapped in surface interface sites that recombine with excess buried channel electrons. The holes are loaded into the interface states by applying a large negative pulse to the gate of the pixel. The negative pulse places the p-type surface channel into inversion, filing the interface states with holes provided by the p+ channel stoppers. This sets the surface potential equal to that of the p– substrate. The gate voltage is then raised to a positive potential, forming a buried channel that collects photocharge.

The channel is buried, so only in overflowing pixels, where channel charge approaches full-well, will the channel electrons recombine with the holes at the surface. The surface holes may be replenished each line-time to increase the overflow protection capability. However, charge-pumped anti-blooming requires a frame transfer device having gates overlying the pixel integration area, buried channels, and a complicated three-level clocking scheme. In addition, such an approach requires sufficient surface interface states to hold anti-blooming holes. In the absence of such interface states, the charge pump negative pulse inverts the surface, but the holes flow out of the surface channel through p+ channel stoppers when the gate voltage is raised to begin the integration time. The requirement of sufficient interface states conflicts with the desire to reduce such states in order to minimize the dark current generated.

In active pixel CMOS imagers, overflow may be handled by using a lateral overflow drain formed from a reset transistor. In photodiode active pixel imagers, the reset transistor resets the photodiode to a reverse-biased condition. If the pixel is overexposed, the photodiode discharges to a potential where the reset transistor is turned on, supplying the photocurrent. The excess photocurrent is dumped into the substrate, where the minority carriers are mainly collected by nearby reverse-biased junctions that form part of the pixel and surrounding pixels. However, these methods have the disadvantage of requiring a pixel structure which includes a lateral reset transistor, and hence the additional surface area and processing steps required to form such a device.

Another proposed method for handling overflowing charges in imagers that are based on a bipolar-transistor pixel, is to use a second emitter in the pixel for the purpose of removing excess image generated charge. The second emitter forms an overflow drain which is biased slightly lower than the first emitter of the phototransistor so that the base-second emitter junction is forward biased sooner than the base-emitter junction when the imaging element is exposed to a strong image. Just before readout of the pixel, the second emitter potential is raised above that of the first emitter, so that current flows into the first emitter during pixel readout. After readout, the second emitter potential is lowered below the first emitter potential to re-enable overflow protection.

This mode of operation prevents the base-emitter junction potential from becoming forward biased during image integration when the phototransistor is exposed to a strong image. Instead, the overflow current of the generated holes is drained to the second emitter, rather than into the first emitter where it would produce noise on the column sense line. However, this method has the disadvantage of requiring a modification to existing active pixel designs, producing a larger device, reducing the fill-factor and quantum efficiency, and necessitating a more complex process flow.

In summary, currently utilized CCD overflow protection mechanisms are either vertical or lateral overflow drains, or are based on charge-pumping. Vertical overflow drains are dominant at present in high resolution, high quality CCD imagers. They afford overflow rejection ratios typically around 10,000, while occupying no extra silicon area. Use of such overflow drains requires complex 2- and 3-dimensional numerical process simulation to design a process flow that will result in the vertical and horizontal doping profiles that produce the correct potential distributions. This fabrication process flow is much more complex than a standard CMOS flow. In existing CMOS process based active-pixel imagers, overflow protection is generally provided by the reset transistor in each pixel. This lateral device is shared, so it does not increase device area or complexity. However, as noted, it does require a pixel design having a reset transistor and the associated more complex process flow and reduced yield for a given size substrate.

Another disadvantage of most imagers, including those formed from the pixel of FIG. 1, is that during each exposure of the image array (termed a "frame"), all of the pixels integrate for a fixed, predetermined amount of time. For bright objects, if the integration time is long enough, this can lead to over-exposure of the pixels, contributing to saturation and eventual overflow of the pixels. Similarly, for dark objects, if the integration time is not long enough, this can lead to under-exposure of the pixels.

In addition, moving objects may give rise to images which are not sharp as a result of the pre-set, fixed integration time for each row of pixels. For example, assume an imager array having dimensions of 1000 by 1000 pixels (105 total pixels) which can be read out at a rate of 10 MHz. These values are typical for a present-day still image device. The assumed characteristics produce a frame time of 0.1 seconds. In such a case, subframe exposure is clearly desirable to avoid image blurring artifacts owing to subject motion or shaking of the camera. Thus, the fixed integration time for all of the pixels can give rise to both exposure and image clarity problems.

In CCD based imagers, the pre-set integration time issue may be addressed by resetting the pixels during the frame period so that the integration time of the pixels is shortened from its full-frame value. The reset pulse is applied to each row once per frame (readout cycle), with the reset pulse being applied to all rows at the same time. The reset pulse causes the pixels to dump the integrated charge, with the removed charge being passed through a reset switch. This provides both an improvement in image clarity for moving objects and reduces the integrated charge built up during the frame time when a bright image is captured.

However, this approach to implementing an electronic shutter has disadvantages. A global electronic shutter reset mechanism which acts on all pixels in the array simultaneously results in different integration times for different rows of pixels. This complicates the processing of the image and the production of a realistic image of the illuminating object. In interline transfer or frame transfer CCD imagers, this complication is addressed by having integrated photocharge from pixels in the array "hidden" from further changes by transfer to the adjacent CCD (interline transfer imagers) or to charge storage sites (frame transfer imagers) that are covered by metal. In either type of CCD imager, the charge transfer from imaging to storage elements occurs very rapidly and simultaneously for the entire array. This permits a shutter function to be realized by simultaneously resetting all of the pixels in the array.

However, this approach is not applicable to some active pixel based imagers. In such active pixel designs the pixels integrate continuously whenever they are illuminated; there are no sites where integrated pixel photocharge can be temporarily stored. Hence, a global electronic shutter reset would not be an appropriate shuttering mechanism for such pixel designs.

Instead, in such active pixel imagers, an electronic shuttering function is implemented by restricting the pixel integration period to a subframe. The array is read out line by line, with the pixels being reset a certain number of line-times before they are read out. The charge removed as a result of the reset (shutter) pulse is passed through a lateral reset transistor. The number of line-times the pixels integrate after they are reset and before they are readout determines the exposure. However, this method has the disadvantage of requiring a pixel structure which includes a lateral reset transistor, and hence the additional surface area and processing steps required to form such a device.

What is desired is an imaging array and method of operating the same which solves the overflow and shuttering problems in a more efficient manner than that presently available. It is desirable to utilize an unmodified pixel to solve these problems since such an approach does not result in an increase in the pixel area or require a more complex process flow. This permits the fabrication of high resolution imaging arrays using less complex processing methods. It is also desired to implement these features in a manner which doesn't contribute artifacts to the sense amplifier signal representing the readout of the pixels. These and other advantages of the present invention will be apparent to those skilled in the art upon a reading of the Detailed Description of the Invention together with the drawings.

SUMMARY OF THE INVENTION

The present invention is directed to an imaging array having overflow protection and electronic shuttering features. The array is formed from a plurality of capacitively coupled bipolar phototransistors arranged into rows and columns. Overflow protection is provided by pulsing each row of the imager with a small overflow pulse during the sense amplifier reset phase. The overflow pulse is applied to the base of every pixel in the array by the common row strobe input lines. As a result of the overflow pulse, any pixels that are about to overflow instead dump excess integrated base charge onto the column line and are set to a lower level. For an imager having N rows, each row receives N overflow pulses per frame period, or N-1 pulses if an overflow pulse is not applied to a row being readout.

An electronic shutter is realized using a modified version of the pixel readout timing. The shutter provides sub-frame exposure by restricting the number of line-times a pixel is allowed to integrate during a frame period. For a full-frame exposure, each row is read out once per frame; during readout of a particular row of the array, the pixels in the rows not being readout integrate. For subframe exposure, the pixels in a row are continually reset, using a shutter pulse applied to the row line during the sense amplifier reset phase, until a certain number of rows (line-times) before that row is to be read out. The pixels in the row are then allowed to integrate until read out normally. This reduces the normal integration time for the pixels in the row.

Further objects and advantages of the present invention will become apparent from the following detailed description and accompanying drawings.

DETAILED DESCRIPTION OF THE INVENTION

The inventors of the present invention have recognized that a solution to the overflow and integration time problems present in many imagers can be implemented using an unmodified pixel structure. Instead of adding additional structural features to a pixel, thereby increasing the physical size and processing complexity of the pixel, the existing control signals and/or signal pathways used to operate the pixel can be altered to obtain overflow protection and electronic shuttering functions. By altering the time of application and/or amplitude of the pulses and signal paths used to operate the imaging array (e.g., the readout of the integrated charge stored in the pixels), overflow protection and shuttering features can be implemented in an efficient manner.

Overflow Protection

In accordance with the present invention, an overflow protection mechanism is realized using an unmodified pixel. Assume an example array having N rows. Each row is readout once during a frame period, requiring a time equal to one line-time. Thus, there are approximately N line-times in a frame period. For a specific row, a readout pulse is applied during one line-time and the pixels in that row are allowed to integrate charge during the remaining N-1 line-times.

During normal operation, each pixel in the array is read out once during each frame period. This is accomplished by reading out the integrated charge of each pixel in a row and performing the same operation row by row for the entire array. The readout pulse is applied to a row line that is capacitively coupled to the base terminals of each pixel in a row. The readout strobe pulse is applied to a single row of pixels during the sense phase of the column sense amplifiers. At some time after readout of the row, the sense amplifiers are reset, a new row is selected for readout, and the process is repeated.

The column lines are held to a fixed potential by the sense amplifiers. During the reset phase of the column sense amplifiers, any charge dumped onto the column lines is discarded into the sense amplifier outputs and is not sensed. As the inventors of the present invention have recognized, this provides a mechanism for removing charge which would otherwise contribute to the overflow of a pixel.

To provide overflow protection, each row in the imager is pulsed with a small overflow pulse during each sense amplifier reset phase. Thus, for an imaging array having N rows, N overflow pulses are applied to each pixel during a frame period. This assumes that a row selected for readout also has an overflow pulse applied. It is also possible not to apply the overflow pulse to the selected row, in which case each row would receive N-1 overflow pulses during a frame period. However, the additional complexity required to prevent application of an overflow protection pulse to a row about to be readout would, in most cases, outweigh the benefit of a slightly increased charge capacity for the pixels. The overflow pulse is applied to the base of every pixel in a row using the common row strobe input line. As a result of the overflow pulse, any pixels that are about to overflow instead dump excess integrated base charge onto the column line and are set to a lower level. Note that the lower charge level of the pixels to which an overflow pulse has been applied is subject to being increased due to illumination of the pixels during the following line-time period which is prior to application of the next overflow pulse.

The overflow pulse takes the form of a lower amplitude pixel reset pulse (also referred to as a readout or strobe pulse). However, in contrast to a readout pulse which is applied during a sense amplifier's sensing phase and would cause any dumped charge to register as a signal on the column line, the overflow pulses are applied during the sense amplifier reset phase. Pixels that are not close to overflowing dump a negligible amount (or none at all) of base charge onto the column line because of the exponential current versus base-emitter voltage characteristic of the bipolar transistor, and hence are unaffected by the overflow pulse. This is because the overflow protection pulse does not add charge to a pixel, it only serves to remove charge from an overflowing pixel, i.e., one in which the pixel exposure during a frame period generates an amount of charge greater than that capable of being removed by a readout pulse. If a pixel is not overflowing, the overflow protection pulse raises and then lowers the base voltage, but doesn't appreciably forward bias the base-emitter junction.

As noted, if the imager has N rows, N (or N-1) overflow pulses are applied to each pixel for each readout (strobe)

pulse. A large value of N (typically>1000) provides a large overload capability. This has the affect of multiplying the charge dumping effect of a single overflow pulse by the number of times it is applied (equal to the number of lines) during a read cycle.

To first order, the effect of a strobe pulse on the integrated base charge can be derived as follows. The base coupling capacitance, C, between the readout (strobe pulse) line and the base of the phototransistor and the total base capacitance, Cb, form a capacitive divider between the readout line and base. A voltage step, $\Delta V$, applied to the readout line produces a voltage step, $\Delta V_b$, on the base, where $$\Delta V_b = \Delta V \, C/C_b.$$

Now assume that the base-emitter forward bias caused by the base voltage step causes base current over the time of the pulse which is sufficient to reduce the base potential by the size of the step, i.e., to its value before the step. The amount of base charge dumped during the voltage step is then $$Q = \Delta V_b * C_b = \Delta V \, (C/C_b) * C_b = C \Delta V.$$

Hence, to first order, a strobe pulse dumps an amount of integrated charge from the base region equal to the base coupling capacitance (C) times the strobe pulse amplitude ($\Delta V$). It is noted that the assumption used is valid because of the exponential I-V relationship between the base-emitter current and voltage. The exponential I-V relationship means that nearly all charge transfer across the junction occurs during a very short time period just after application of the strobe pulse.

As has been derived, given a base coupling capacitance, C, between readout line and base, and an overflow pulse with amplitude $V_{ov}$, to first-order each overflow pulse can cause $CV_{ov}$ integrated base charge to be dumped from a pixel. This calculation means that for a pixel to overflow and significantly contaminate readout of other pixels in the column, during a line-time period, the illumination on an almost saturated (overflowing) pixel must be high enough to create more than the $CV_{ov}$ base charge removed during that time. This provides an approximate local lower bound on the desired magnitude of the overflow pulse, i.e, $V_{ov} \geq Q/C$, where Q is the amount of charge added to an almost saturated (overflowing) pixel during a line-time before application of the next overflow pulse. Another means of estimating a lower bound for the overflow pulse magnitude is to look at the problem in a global sense, i.e., in terms of the operation of the array as a whole and the average value of the lower bound needed to prevent overflow. For an array of N rows, the overflow pulsing can remove $NCV_{ov}$ integrated base charge during each frame period. A normal readout pulse with amplitude $V_{ro}$ can remove at most $Q_{cap} = CV_{ro}$ integrated base charge each frame. In order to prevent overflow the global boundary condition is that $$NCV_{ov} \geq Q_{tot} - CV_{ro},$$

where $Q_{tot}$ is the integrated pixel charge produced as a result of exposure.
This formulation gives the condition:

$$V_{ov} \geq (1/N) \, [(Q_{tot}/C) - V_{ro}]$$

If $V_{ov}$ is chosen so that it is the larger of the two lower bound values, then it will have the most general value needed to prevent overflow.

The local and global bounds can be related to each other under some circumstances. Assuming a constant level of illumination on an almost saturated (overflowing) pixel during a frame period, then $Q_{tot} = (N-1)Q$ since each pixel will integrate for (N-1) line times. Note that this assumption will generally not hold for the imaging of moving objects. Given the above relationship, the lower bound conditions become:

(1) $V_{ov} \geq (1/N) \, [(N-1) \, (Q/C) - V_{ro}]$; and (2) $V_{ov} \geq (Q/C)$.

It is noted that for N large, and under the assumed relationship between $Q_{tot}$ and Q, condition (1) reduces to condition (2).

Generally, it is desirable that the overflow pulse be as small as possible to prevent a reduction in the charge capacity, and hence dynamic range, of the pixel. However, the overflow pulse amplitude must be sufficient to remove at least the amount of charge accumulated during a line-time from an almost saturated (overflowing) pixel to prevent overflow of the pixel. The upper bound on the overflow pulse amplitude is determined by what proportion of the pixel charge capacity is able to be given up for the purpose of overflow protection. Thus, determination of the appropriate size of the overflow pulse depends, among other factors, on having knowledge regarding the expected intensity and contrasts of the illumination on the pixel.

As noted, with an array of N rows, the overflow pulsing can remove $NCV_{ov}$ integrated base charge during each frame. A normal readout pulse with amplitude $V_{ro}$ can remove at most $Q_{cap} = CV_{ro}$ base charge each frame. The ratio of these charges, $R = NV_{ov}/V_{ro}$, is the overflow rejection ratio. The overflow rejection ratio (R) is the ratio by which a pixel exposure can exceed the normal pixel charge capacity ($CV_{ro}$) without causing overflow based image degradation (column artifacts). For N=1000 rows, $V_{ro}$=2V, $V_{ov}$=200 mV, the overflow rejection capability is R=100; a spot 100 times brighter than the saturation brightness will not cause significant streaking. Without overflow protection pulses, the overflowing pixel would charge up after 1/100th of the frame, or 10 line-times after it is read out, forward bias, and begin overflowing and dumping charge onto the column during the sense amplifier sense phase of other pixels.

Note that the inherently large ratio between the line-time and frame period (N) permits the application of multiple overflow pulses to a pixel during a frame period. In addition, application of a pulse every line-time (as opposed to intermittently) permits the use of the smallest possible amplitude for each overflow pulse which is capable of achieving the desired result. In contrast, an overflow pulse applied once every (m) line-times would, to a first approximation, need to be able to remove (m) times the charge accumulated during one line-time. Thus, the general criteria for the overflow pulses is that they be applied during the sense amplifier reset periods (to prevent the dumped charge registering as a signal), that they preferably be applied every line-time, and that they be the minimum amplitude required to prevent additional charge build-up as a result of continued illumination of the pixels.

Application of the overflow pulse each line-time permits the use of a smaller amplitude overflow pulse, and hence a minimal reduction in the charge capacity and dynamic range of the pixels. By applying the overflow pulses during the sense amplifiers reset phases so that the dumped charge doesn't contribute to the sensed signal, an N-fold increase of the net effect of a small overflow pulse is obtained.

As noted, overflow protection pulses provide an overflow rejection ratio, R, equal to $NV_{ov}/V_{ro}$. Suppose that in the absence of using overflow pulses a pixel is exposed to a level equal to R times its saturation value, i.e., $R*Q_{cap}$. What artifact is produced by this level of overexposure, i.e., what charge artifact is output by such an overflowing pixel onto the column line during a sense phase of a different pixel's readout cycle? In such a case, the charge removed from the pixel base during one line-time from this pixel will be $$Q_{ov} = R \frac{1}{N} Q_{cap} = \frac{V_{ov}}{V_{ro}} Q_{cap}$$

or, in the case above, 1/10 of the pixel capacity. This is a significant portion of the pixel's range. Every pixel in the column (except those read out just after readout of the overflowing pixel) will be contaminated to this extent. This demonstrates the utility of having overflow protection for the pixels of the imager. Note that if more than one pixel is overflowing, the artifact is multiplied by the height in pixels of the overflowing area.

The cost of obtaining the overflow protection is a loss of a portion of the top-end dynamic range. The ratio $V_{ov}/V_{ro}$ describes the portion of the original saturation capacity which is used for overflow protection and hence is not available as integrated image charge. This also illustrates why it is beneficial to use as small an overflow pulse as possible, within the constraint(s) posed by the need to remove more charge than is accumulated during one line-time as a result of illumination of a nearly saturated (overflowing) pixel. A smaller pulse causes less of a reduction in dynamic range while still providing overflow protection.

The overflow protection pulses reduce the saturation charge capacity by a factor $V_{ov}/V_{ro}$. A pixel with an exposure of less than $CV_{ro}(1-V_{ov}/V_{ro})$ is unaffected by the overflow protection pulses, because the base voltage never charges up during a frame period to a sufficient level to appreciably forward-bias the base-emitter junction as a result of applying an overflow protection pulse. A pixel with an exposure greater than $CV_{ro}$ per frame, but less than $CV_{ro}(1+R)$, does not overflow enough to produce artifacts, but its charge capacity is limited to the saturation value.

Electronic Shutter

An electronic shutter which is used to vary the integration time of pixels can be realized by modifying the time of application of the pixel readout signals. The shutter provides sub-frame exposure by restricting the number of line-times a pixel is allowed to integrate. For a full-frame exposure, each pixel in a row is read out once per frame; during readout of the other rows of the array, the pixels in the row integrate. Thus, for an array having N rows, each pixel in the row integrates for approximately N-1 line times. For sub-frame exposure, the pixels in a row are continually reset, using a shutter pulse applied to the row lines during the sense amplifier reset phase, until a certain number of rows (line-times) before the shuttered row is to be read out. The pixels in the shuttered row(s) are then allowed to integrate until read out normally. This reduces the normal integration time for the pixels in a shuttered row from a full frame (N-1 line-times) to a lesser value. The number of line-times a row of pixels is allowed to integrate, and hence the time during a frame period at which the shutter pulses are discontinued, can be determined by the characteristics of the image being captured and those of the imaging pixels. These include the expected motion of the imaged object during the frame period, its illumination level, and the charge capacity of the pixels.

The electronic shutter of the present invention acts similarly to a focal plane mechanical shutter used in many film based still cameras. Both the electronic shutter and the mechanical shutter produce a strip of exposed image area that sweeps across the image plane. A difference is that mechanical focal plane shutters use two blinds that sweep across the image plane. The first blind initially covers the film and is swept away to expose the film. The second blind starts its sweep a time T after the first blind starts its sweep, where T is the exposure time, and acts to re-cover the film.

The preceding computation regarding the effect of overflow protection pulses on the integrated base charge level and the derivation of the overflow rejection ratio R can be extended to the case of using both overflow protection and electronic shuttering. When the electronic shutter is used to produce a subframe exposure of M lines (out of the N lines in the entire array), the overflow rejection ratio becomes $$R = M \frac{V_{ov}}{V_{ro}}$$

where M has replaced N in the previous expression. Now, R scales with the number of lines that are exposed by the shutter. In an imager with N=1000 rows, where M=100 rows are exposed by the electronic shutter, and using overflow protection pulses of 0.1 volts and a strobe pulse of 1 volt, R=100*(0.1/1)=10. Hence it is generally true that the overflow rejection afforded by overflow protection pulses scales as the number of lines per frame that are exposed, not the total number of lines.

The preceding formula for R can be computed as follows. Each overflow protection pulse can remove $CV_{ov}$ charge per line time, or $MCV_{ov}$ per frame. The pixel charge capacity is $CV_{ro}$ per frame. The ratio of the charge per frame that the overflow protection pulses can remove, to the pixel charge capacity, is the overflow rejection ratio R given in the preceding formula.

Imager Architecture

An imager architecture that realizes both overflow protection and electronic shuttering can be constructed by using two vertical scan shift registers (scanners). One scanner serves to multiplex the normal readout pulses by selecting a single row for readout. The other scanner controls the electronic shutter and overflow features. This shutter/overflow scanner acts to select the row or rows to which the shutter and overflow pulses are applied. As the shutter pulse acts to reset the pixels, the pixels in the shuttered rows are prevented from integrating. The overflow protection pulses are applied at the same time as the shutter pulses, but to the rows of pixels that are integrating.

Figure 4:
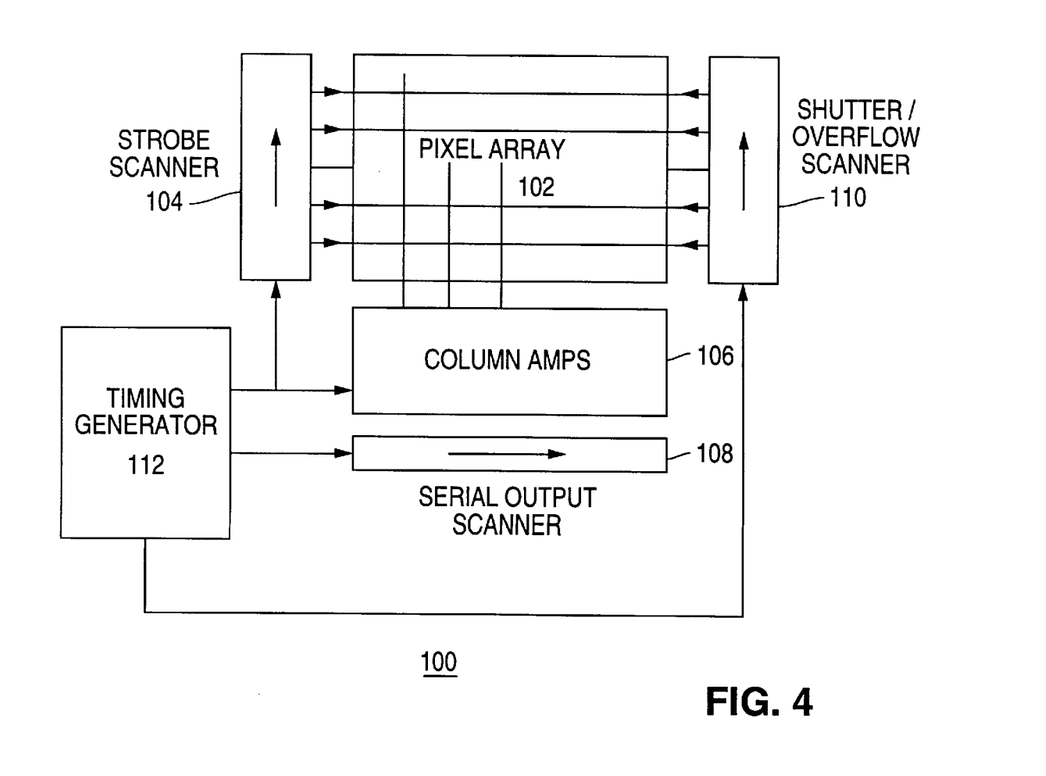
FIG. 4 is a block diagram showing the layout of an imager which incorporates the overflow protection and electronic shuttering features of the present invention.

FIG. 4 is a block diagram showing the layout of an imager 100 which incorporates the overflow iprotection and electronic shuttering features of the present invention. Imager 100 includes a pixel array 102 formed from a plurality of pixels which are arranged into rows and columns. Strobe scanner 104 is used to select the row of array 102 to which the strobe or row select pulse is applied for the purpose of reading out that row of pixels. A column charge sense amplifier 106 is connected to each of the columns of array 102 and serves to sense the amount of charge dumped onto each column line during a readout of a row of the array. The column charges are sensed in parallel by the amplifiers at the bottom of each column. After sensing, the results are sampled and held for each column. While the sense amplifier outputs for a row of pixels is being sensed, the previous row's data is scanned out serially under the control of serial output scanner 108. A sense amplifier suitable for use in implementing the imager architecture of the present invention is described in U.S. patent application Ser. No. 08/679,686, entitled "Sense Amplifier Employing Correlated Double Sampling for High-Density Imaging Array", filed Jul. 30, 1996, and the contents of which is hereby incorporated by reference.

However, in accordance with the present invention, shutter/overflow scanner 110 is used to determine to which rows shutter and overflow control pulses are applied. Timing generator 112 generates the timing (control) signals used to control the operation of strobe scanner 104, column amplifiers 106, output scanner 108, and shutter/overflow scanner 110.

Figure 5:
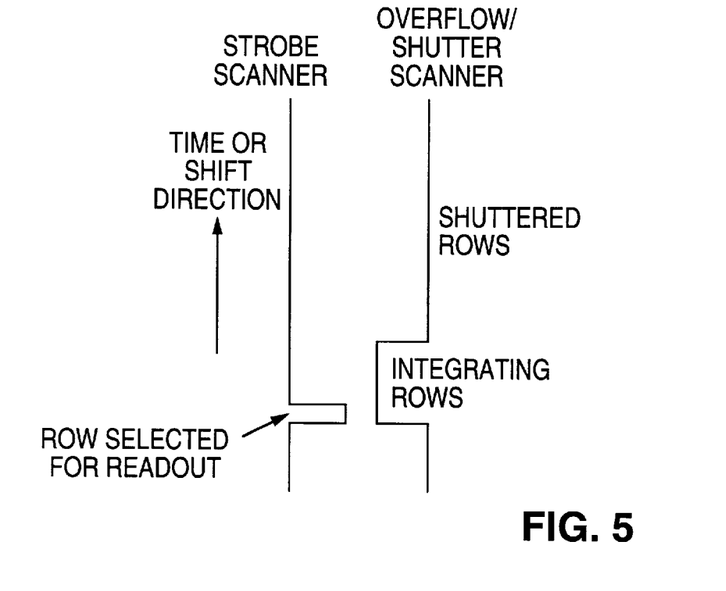
FIG. 5 shows in greater detail the row selection signals applied by the readout (strobe) scanner and shutter/overflow scanner.

FIG. 5 shows in greater detail the row selection signals applied by the readout (strobe) scanner and shutter/overflow scanner. The strobe scanner is loaded with a single readout bit signifying which row of the array is to be read out. The shutter/overflow scanner is loaded with a number of bits, as shown. Both scanners shift their contents vertically, and are reloaded from the bottom in a circular manner, so each row of the imager sees the same clocking pattern over each frame. This causes the rows of the array to be sequentially readout, while applying the shutter and overflow pulses in a desired manner.

For a full-frame exposure, the shutter/overflow scanner is not loaded with any bits; only overflow pulses are applied. Each pixel thus integrates for (N-1) line times, where N is the number of rows in the array. For a single-line time exposure, all of the registers in the shutter/overflow scanner are loaded with bits. Each pixel is allowed to integrate during the time interval between the shutter pulse and the readout pulse, which corresponds to a time period slightly less than a single-line time.

Figure 6:
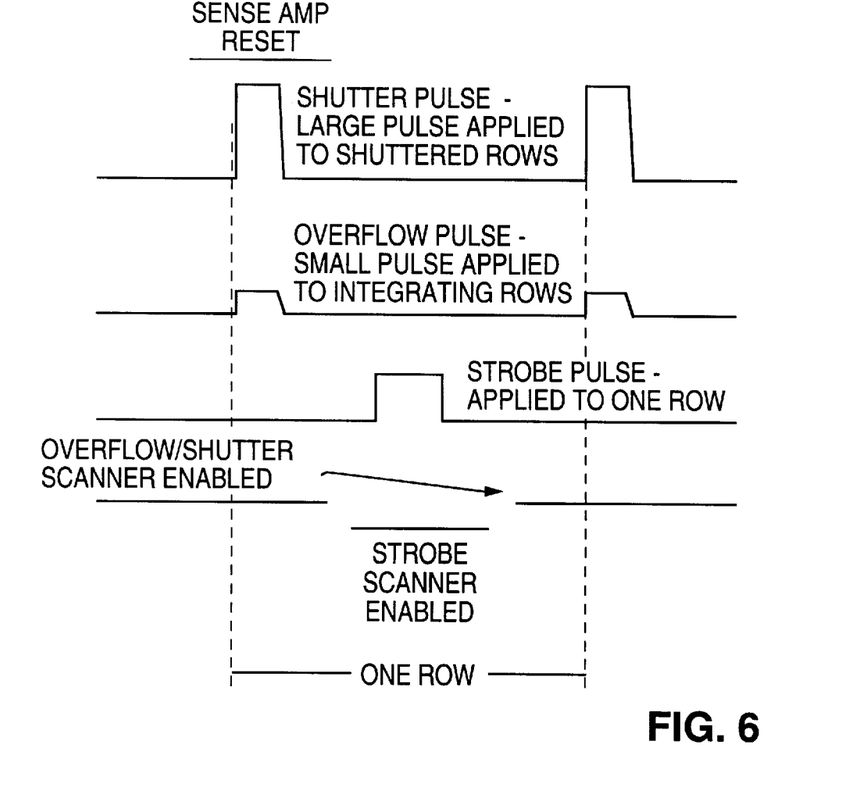
FIG. 6 is a diagram showing the timing of the readout and shutter/overflow pulses during a single row readout cycle.
Figure 7A:
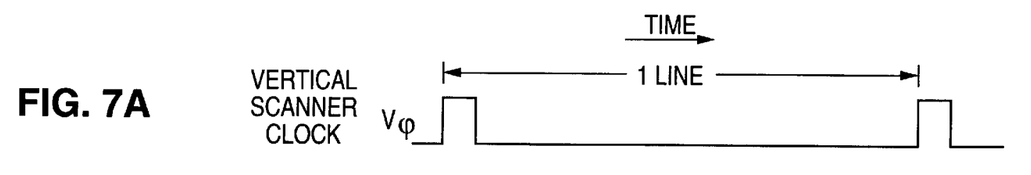
FIG. 7 is a detailed timing diagram showing the relationship between the strobe, sense amplifier, and shutter/overflow signals for one readout cycle of the imaging array.
Figure 7B:
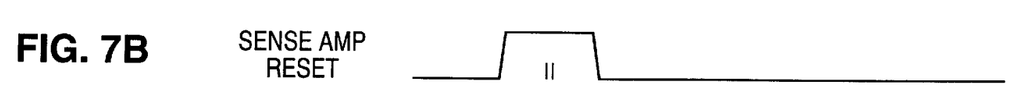
Figure 7C:
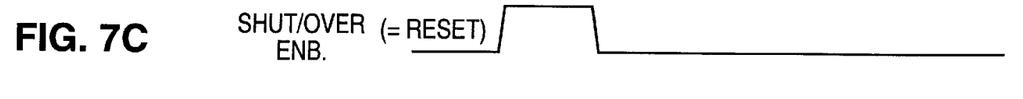
Figure 7D:
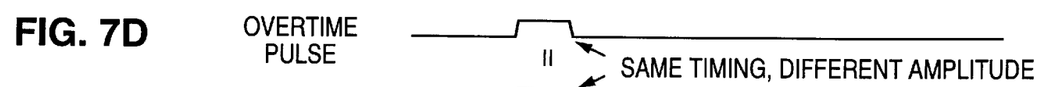
Figure 7E:
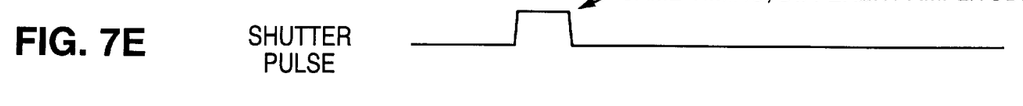
Figure 7F:
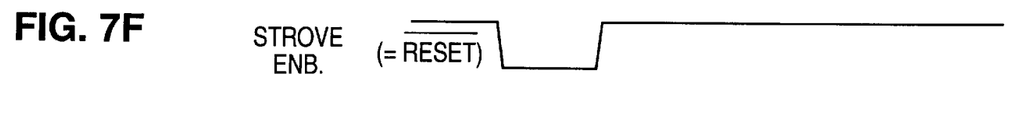
Figure 7G:
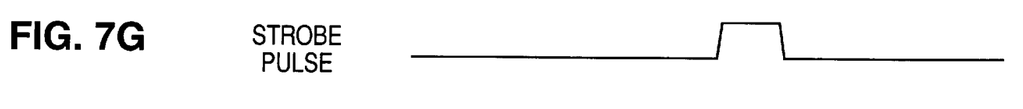
Figure 7H:
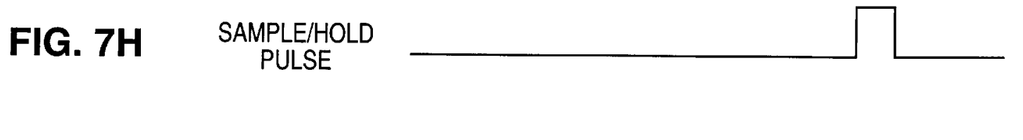

FIG. 6 is a diagram showing the timing of the readout and shutter/overflow pulses during a single row readout cycle. At the start of a readout cycle, the sense amplifier for each column of the array is reset. During reset, the shutter and overflow pulses are applied to every row in the array from the shutter/overflow scanner, where bits (as shown in FIG. 5) in the scanner determine whether a shutter or overflow pulse is applied to a particular row. iDuring reset, the readout (strobe) scanner is disabled.

During the readout phase, the shutter/overflow scanner is disabled and the readout (strobe) scanner is enabled. The sense amplifiers are placed in the sensitive state, and a readout pulse is applied to a single row selected by the readout scanner. Other clocks, not shown in FIG. 6, are also active. These include the clocks used to control the correlated double sampling and sample and hold circuitry. The cycle shown in FIG. 6 is completed when both scanners shift to the next row in the array.

Figure 9:
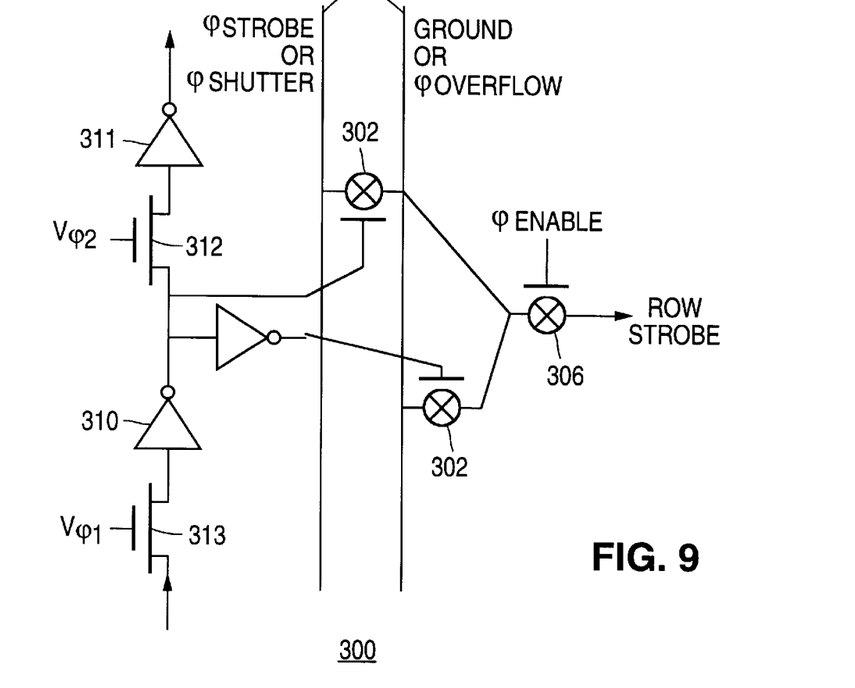
FIG. 9 is a schematic diagram showing a single cell of the vertical shift register and multiplexers used in the strobe (readout) and shutter/overflow scanners shown in FIG. 8.

FIG. 7 is a detailed timing diagram showing the relationship between the strobe, sense amplifier, and shutter/overflow signals for one readout cycle of the imaging array. In the diagram, $V\phi$ is the clock signal for the vertical scanners. In the preferred embodiment of the present invention, as shown in FIG. 9, $V\phi$ is a two phase clock signal, however, for simplicity it is shown as a single phase signal in FIG. 7.

Inspection of the figure indicates that, if desired, the shutter/overflow enable signal can be made to be the same as the sense amplifier reset signal. Note that at any time during which the sense amplifier is held in a reset state (i.e., the input is shorted to the output), the overflow and shutter pulses may be applied. Additionally, the strobe enable signal may be taken as the inverse of the shutter/overflow enable signal. Row strobe pulses are applied while the sense amplifier is in a sensitive state (i.e., the input is not shorted to the output). The sense amplifier reset signal may thus be used to efficiently derive the shutter/overflow enable signals.

FIG. 7 indicates that the overflow and shutter pulses have identical timing and differ only in amplitude. Persons of skill in the art will recognize that well known methods exist for generating pulses having different amplitudes from a common timing signal.

Figure 8:
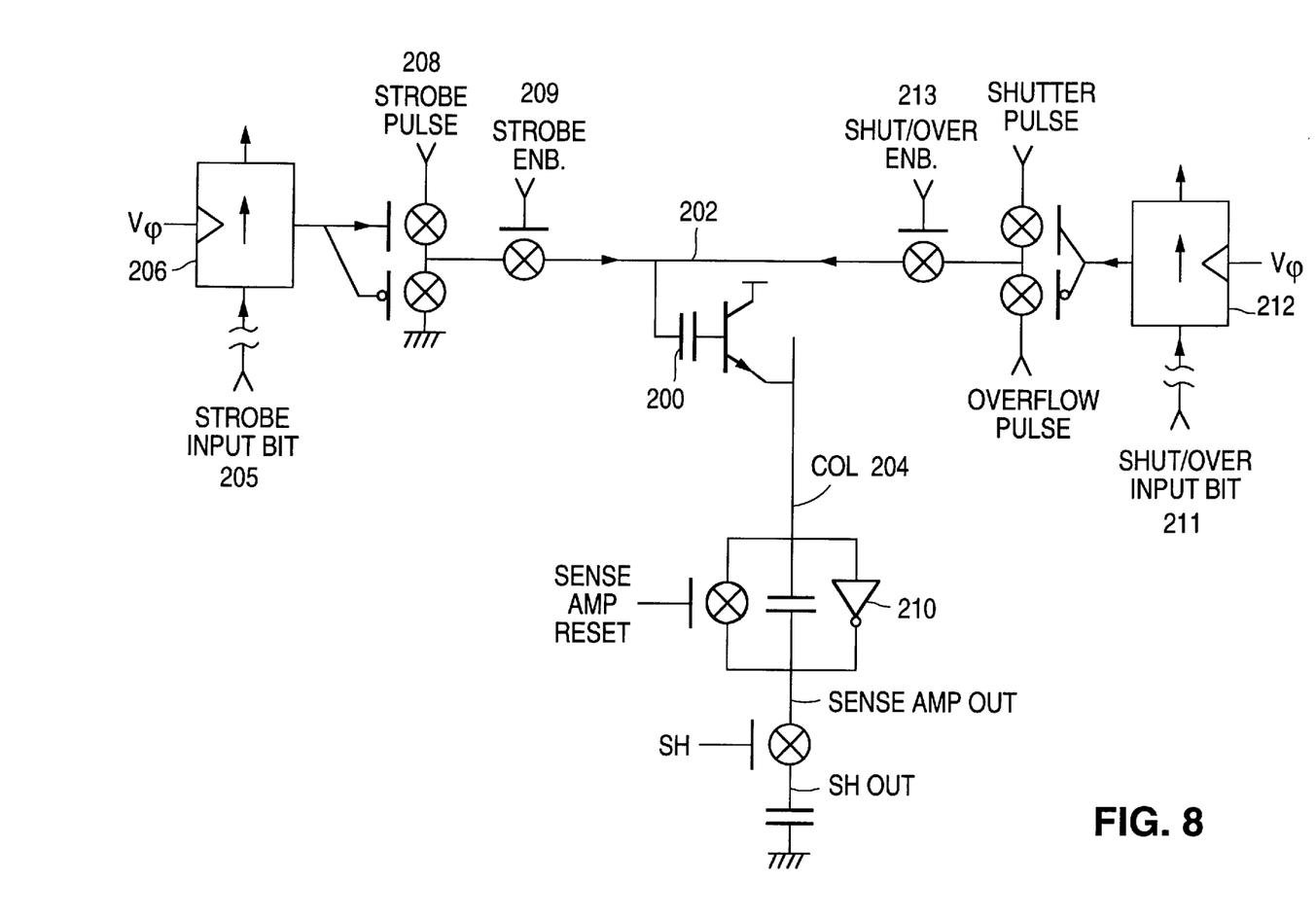
FIG. 8 is a schematic showing the scanner and sense amplifier circuitry attached to a single row and column of the imager array of the present invention.

FIG. 8 is a schematic showing the scanner and sense amplifier circuitry attached to a single row and column of the imager array of the present invention. The circles having X's through them shown in the figure are analog MOS transmission gates. As shown in the figure, the location of a pixel 200 is defined by its row select line 202 and column line 204. Strobe input bit 205 is an input to the first stage of a vertical shift register contained in strobe scanner 206. Similarly, shutter/overflow input bit 211 is an input to the first stage of a vertical shift register contained in shutter/overflow scanner 212. Strobe scanner 206 is used to apply a strobe (row readout) pulse to row select line 202 based on the contents of that row's register cell. This value in turn depends upon the bit pattern represented by strobe input bit(s) 205. A global strobe enable signal is applied to strobe scanner enable switch 209 to permit access to row select line 202 prior to application of the strobe pulse. Scanner enable switch 209 may be implemented in the form of MOS complementary n-fet and p-fet transmission gates. The scanner enable switch is used to prevent the row select lines from being driven simultaneously from both sides, i.e., by the strobe and shutter/overflow scanners. A sense amplifier circuit 210 is connected to column line 204. Sense amplifier circuit 210 is reset prior to being used to sense the current on column line 204. Shutter/overflow scanner 212 is used to apply electronic shutter and overflow pulses to row select line 202 based on the contents of that row's register cell, which depends upon the bit pattern represented by shutter/overflow input bit(s) 211. A global shutter/overflow enable signal is applied to shutter/overflow scanner enable switch 213 to permit access to row select line 202 prior to application of the shutter/overflow pulse. Scanner enable switch 213 may be implemented in the form of MOS complementary n-fet and p-fet transmission gates.

FIG. 9 is a schematic diagram showing the preferred embodiment of a single cell 300 of the vertical shift register and multiplexers used in the strobe (readout) and shutter/overflow scanners shown in FIG. 8. As with FIG. 8, the circles having X's through them shown in the figure are analog MOS transmission gates. Although a dynamic shift register is shown in FIG. 9, other types of scanning devices capable of a similar functionality may be used. A dynamic shift register has the advantage of simplicity and the ability to be fit into the narrow pitch of a pixel array. As shown in the figure, a pair of analog MOS switches 302 connect one of two global wires 304 which carry the strobe and shutter/overflow pulses to selected rows. A third switch 306 controlled by a global signal tri-states the row connection, to allow access to the row line from either the readout or the shutter/overflow scanners.

Each cell or stage of the dynamic shift registers includes two inverters 310 and 311 with a single-transistor pass gate 312 and 313 at the input of each inverter. The output of the first inverter 310 feeds into pass gate 312 at the input to the second inverter 311. The output of the second inverter 311 feeds into the pass gate at the input to the first inverter of the next stage (not shown). Pass gates 312 and 313 are driven by a two-phase non-overlapping high-going clock generator that generates the two clock phases $V\phi_1$ and $V\phi_2$, which were shown as a single pulse $V\phi$ in FIG. 7.

Figure 10A:
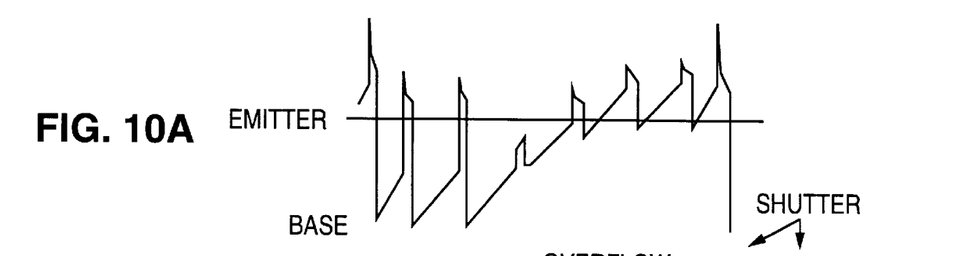
FIG. 10 is a diagram showing the relative timing of a set of example shutter, overflow, and strobe pulses input to a pixel contained in the imaging array of the present invention, and the qualitative behavior of the emitter and base nodes of the pixel.
Figure 10B:
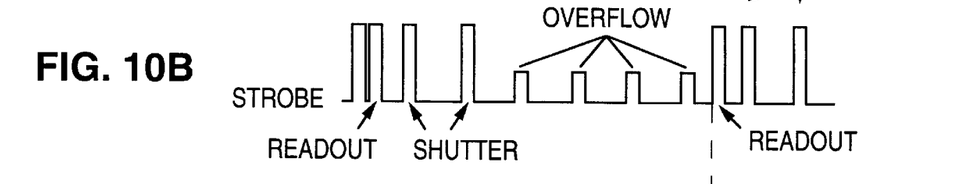
Figure 10C:
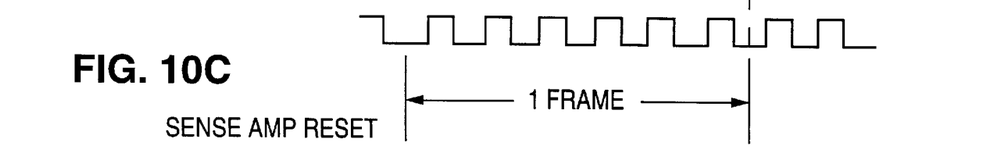

FIG. 10 is a diagram showing the relative timing of a set of example shutter, overflow, and strobe pulses input to a pixel contained in the imaging array of the present invention for the case of N=7 and M=4. Note that these values of N and M are not realistic for a practical imager and are used for purposes of illustration only. Also shown in the figure is the qualitative behavior of the emitter and base nodes of the pixel. The reset pulses shown in the figure are the sense amplifier reset pulses applied to the sense amplifier at the bottom of the column containing the pixel. Readout of the pixel occurs during the sense amplifier sense phase which is in-between the reset pulses applied to the sense amplifier.

Inspection of the strobe signal shown in FIG. 10 shows that two shutter pulses are applied on the strobe line during the sense amplifier reset phase, followed by four overflow protection pulses, also applied during the sense amplifier reset phase. Next, a readout pulse is applied between sense amplifier reset pulses, followed by two more shutter pulses applied during the reset phase. At all times the sense amplifier holds the pixel emitter at a fixed potential. Inspection of the pixel base signal shows that the pixel is under strong illumination because the base rapidly charges up towards the emitter. Thus, the base signal would lead to forward-biasing of the base-emitter junction if the shutter and overflow pulses were not applied.

The first and second shutter pulses shown in the figure reset the pixel base node to a level below that of the emitter. The first overflow protection pulse has no effect on the integrated charge stored in the base because the base has not become sufficiently charged so that application of the overflow pulse appreciably forward-biases the base-emitter junction. The base potential just prior to and just after application of the first overflow pulse shows that the base potential is unchanged from its value in the case where no overflow pulse is applied. The second and subsequent overflow pulses do have the effect of forward-biasing the base-emitter junction and removing integrated base charge during the sense amplifier reset phase. The base charge reduction is evident by inspecting the base potential before and after application of these overflow pulses. The base potential is reduced after the pulses from the value it would have had if no overflow pulse was applied. The base charge removed from the pixel by applying the overflow pulse on the strobe input line is equal to the change in the base potential times the total base capacitance.

Figure 11:
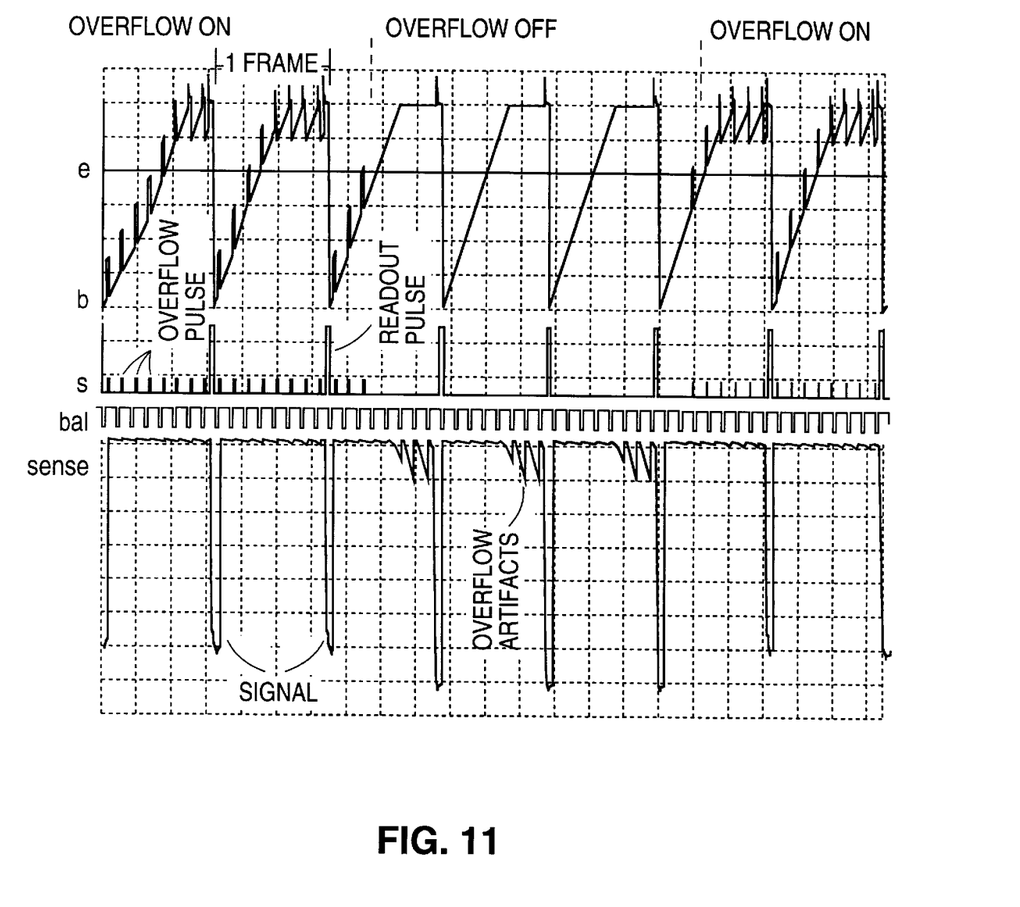
FIG. 11 shows the results of a simulation of the overflow protection mechanism of the present invention for an imager with eight rows.

In addition to constructing a functional imager embodying the features of the present invention, the inventors have conducted a set of simulations to allow observation of the base node behavior, which is not directly observable during normal operation of the overflow protection and electronic shuttering features. FIG. 11 shows the results of a simulation of the overflow protection mechanism of the present invention. The simulation results of FIG. 11 show the base voltage of a single overflowing pixel, along with the response of the sense amplifier at the bottom of the column containing that pixel, for the example of an imager with N=8 rows of pixels. The simulation covers a frame period consisting of 8 line cycles. The other 7 pixel base voltages from the column are not shown. Their illumination is zero, and hence they contribute no signal to the column. The intent of the simulation is to demonstrate the artifacts caused by an overflowing pixel on the sense amplifier outputs for the other, non-overflowing pixels in the column.

In the figure, b is the base voltage, the straight line horizontally intersecting b is the emitter voltage e, s is the active-high row select line voltage that applies readout and overflow protection pulses to the pixel, bal is the active-low sense amplifier reset pulse, and sense is the active-low sense amplifier output. The sense amplifier reset pulse and the sense amplifier output signals are low-going; the amplifier is reset while the signal is low, and a larger pixel charge output is represented as a larger negative change in the sense amplifier output relative to its reset value.

In the simulation of FIG. 11, eight cycles of overflow/sense amplifier reset are interposed between each readout pulse. During the middle half of the simulation, the overflow pulses are turned off. As noted, the bottom trace (sense) shows the sense amplifier output. The overflow during the middle of the simulation is much larger than during the time overflow pulses are active. The readout pulse $V_{ro}$ is a factor of 4 larger than the overflow protection pulse $V_{ov}$, as is evident from inspection of the row select signal. There are N=8 rows in the simulation. Earlier analysis predicted that, to first-order, the overflow rejection ratio should be $R=N*(V_{ov}/V_{ro})=8*(¼)=2$. This is confirmed by the results of the simulation because the exposure of the overflowing pixel is about double the normal saturation exposure. This can be seen by observing that the base voltage intersects the emitter voltage about halfway through the frame cycle starting after a readout pulse. Hence, the simulation confirms the first-order analysis of the overflow rejection process presented earlier.

Overflow artifacts are evident during the middle of the simulation and are labelled as such. The sense amplifier output ramps downwards from its reset state during the 2 or 3 lines read out just before the overflowing pixel, because the overflowing pixel dumps current onto the column continuously during the sensing phases of the sense amplifier. During the beginning and end parts of the simulation (where overflow protection pulses are applied), the overflow artifacts are much smaller, and in fact barely visible. The overflow protection pulses lower the overflowing pixel base charge sufficiently that the current flowing out of the overflowing pixel during the sensitive phases of the other pixels is negligible.

Figure 12:
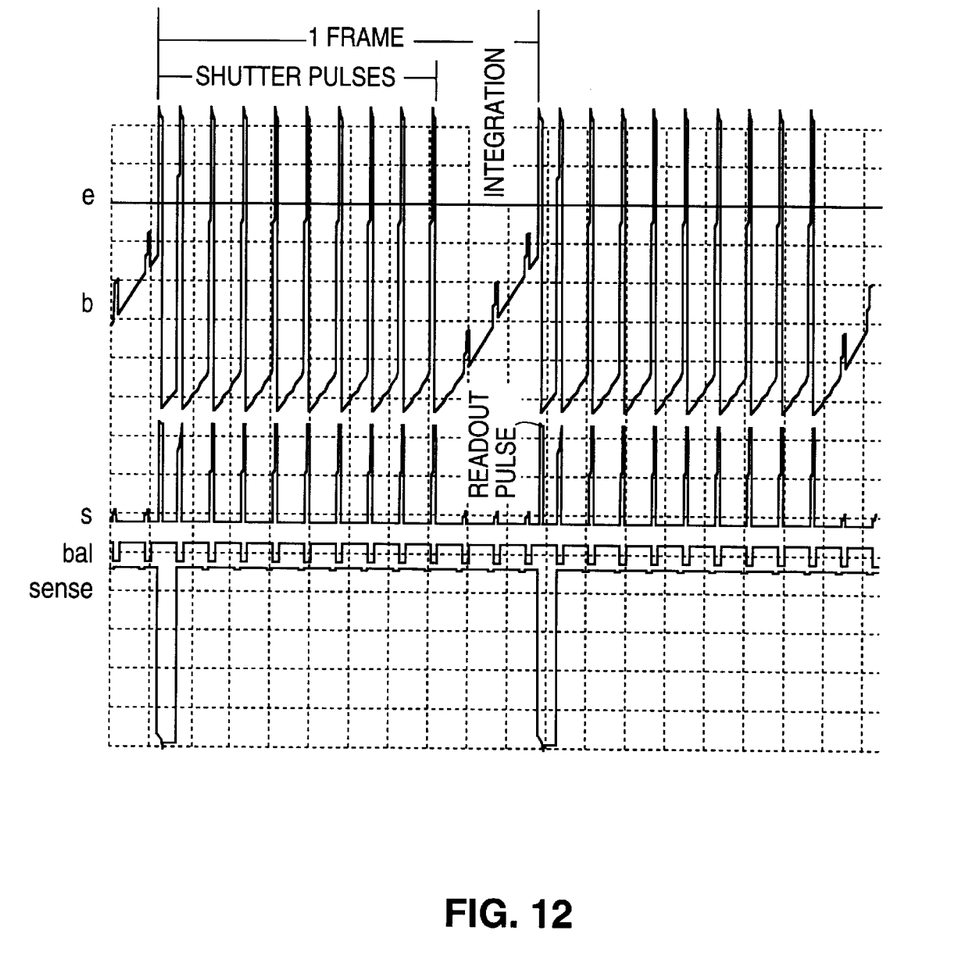
FIG. 12 shows the results of a simulation of the electronic shutter mechanism of the present invention for an imager with 12 rows.

FIG. 12 shows the results of a simulation of the electronic shutter mechanism of the present invention for an imager with N=12 rows and M=3. As before, b is the base voltage, the straight line horizontally intersecting b is the emitter voltage e, s is the active-high row select line voltage that applies readout and shutter pulses to the pixel, bal is the active-low sense amplifier reset pulse, and sense is the active-low sense amplifier output. The simulation shows how the electronic shutter can reduce the integration time so that a pixel which would saturate with a full-frame exposure can be brought within the dynamic range of the pixels using a subframe exposure.

For the first 9 line cycles of the simulation, shutter pulses are applied on the row select line. For the next 3 cycles (during charge integration), overflow protection pulses are applied. Finally, a readout pulse is applied. As is evident by inspection of FIG. 12, the shutter, overflow protection, and readout pulses differ only in their amplitude and timing and the scanner which applies the pulse to the row select line. The shutter pulses are the same amplitude as the readout pulse, but are applied when the sense amplifier is reset; the shutter pulses act to reset the pixel base to the same level as does the readout pulse, with the difference being that the output charge is not sensed. Inspection of the figure also shows that the pixel is effectively only allowed to integrate for approximately M=3 lines, i.e., after the shutter pulses are replaced by overflow protection pulses. The pixel, which clearly would overflow during a full-frame exposure, is kept within its charge capacity by the reduced integration time.

The sequence of events and control signals used to perform a readout cycle of a selected row of an imaging array incorporating the overflow protection and shuttering features of the present invention are as follows:

(1) enable shutter/overflow scanner;
(2) reset the sense amplifier(s);
(3) apply either an overflow pulse or shutter pulse to every row during the reset phase;
(4) enable the sense amplifier(s) to start the sense phase of the amplifier(s);
(5) enable the strobe (readout) scanner to enable the strobe pulse pathway (this typically involves turning on the strobe scanner enable switches);
(6) pulse the row strobe line to the selected row, dumping the integrated charge and resetting the pixels in the row;
(7) each pixel in the selected row dumps its integrated charge to its corresponding column line and associated sense amplifier;
(8) sense the dumped charge, generating a sensed charge signal;
(9) transfer the sensed charge signal from the sense amplifier(s) to the sample and hold stage;
(10) sequentially clock the charge signals out of the array column by column; and
(11) repeat process for the next row.

Note that sequential clocking of the charge signals out of the array column by column occurs concurrently with the listed steps, except for the sample and hold step, which must be applied after the last row is scanned out and before scanning of the current row can be started. Serial readout of a row's output starts just after application of the sample and hold pulse and is completed just before the next sample and hold pulse.

An imaging array having overflow protection and electronic shuttering features has been described. The array is formed from a plurality of active pixel sensors which are based on a bipolar phototransistor. The transistor has a floating integration node which is capacitively coupled to a row select line. The use of a floating integration node (the base of the bipolar transistor in the example shown) reduces the physical size and number of processing steps required to fabricate the pixels.

However, the use of a floating node results in the lack of a direct electrical connection between the integration node and a possible overflow drain. This means that a different method of implementing overflow protection and shutter functions from those found in the art must be used.

The inventors of the present invention have recognized that overflow protection and electronic shuttering functions can be implemented by varying the amplitude and time of application of the pulses and/or pulse pathways used to readout and reset the pixels of the array. Overflow protection is achieved by applying a low amplitude pulse to the integration node of the pixels (through the row select line) during the reset phase of the sense amplifiers. The overflow protection pulse is applied once to each pixel in a row during each line-time. Thus, each pixel in a row receives a number of overflow control pulses equal to the number of integration line-time periods in a frame period (which is equal to the number of rows, N, in the array, or the shutter period, M). The overflow pulse can be applied to the row being readout or not, although it may be easier to implement a design in which the pulse is applied, since then it is applied to every row which is not shuttered.

The amplitude of the overflow protection pulse(s) is selected to be sufficient to prevent overflow of the pixel, but not so strong that it appreciably reduces the capacity of the pixels to collect the amount of charge required to produce a usable image. This is because a larger overflow pulse increases the overflow rejection ratio, but reduces the dynamic range of the pixels.

The electronic shutter feature is implemented by applying a shutter pulse to each row of pixels to be shuttered. The shutter pulse is applied via the row select line which capacitively couples the pulse to the base of the pixel. As with the overflow pulse(s), the shutter pulse(s) are applied during the sense amplifier reset period. The shutter pulse has the same amplitude as the reset or strobe readout pulse which is applied to the row select line during the sense amplifier sensing phase as part of the process of reading out a row of pixels. The shutter pulse is used to reset the pixel charge to the level it would have had if readout had occurred. This in effect restarts the integration period for the row of pixels. However, since the shutter pulse is applied during the sense amplifier reset phase, the charge dumped from the shuttered pixel does not contribute to the sensed charge signal produced by the sense amplifiers.

The present invention achieves a high degree of overflow rejection by applying multiple overflow pulses to each pixel in a row, with the number of pulses being equal to the number of integration line- times in a (readout) frame period. This is in contrast to other possible implementations of overflow control which are based on a lateral or vertical overflow drain, or a complicated clocking mechanism. Each of these other implementations requires either a larger pixel size, more complex processing, or both.

Although the present invention has been described with reference to the overflow and shutter pulses being applied via the row select line, other implementations are also possible. For example, overflow control may be accomplished by pulsing the pixel emitters with a low going pulse during the sense amplifier reset phase by varying the sense amplifier reset point. In this situation the row select (strobe) lines are used to apply the shutter pulses to the shuttered rows, while an overflow pulse is applied to every column of the array by means of the sense amplifier. In this format, the shutter pulse applied to a row would actually be the sum of the overflow and shutter pulses applied to the pixel nodes. This is because it would be the sum of the shutter pulse applied to the base node via the row select line and the emitter overflow pulse applied via the column line.

Another possible variation of the present invention involves the readout of the sense amplifier outputs. The invention is not limited to serially scanning out the column sense amplifier outputs, but may also be implemented using on chip analog-to-digital converters. The converters would digitize the sense amplifier outputs in parallel, with the digitized outputs being serially output.

Yet another possible variation of the present invention relates to the orientation of the sense amplifiers and select lines with respect to the sides of the array. In the embodiment of the invention previously described, the select lines are connected to the rows of the array with the select scanners along the right or left side of the array, and the sense amplifiers are located at the bottom of the array connected to the column lines. However, the positions of the rows and columns may be interchanged, in effect rotating the array and associated elements on the chip by 90 degrees. This places the sense amplifiers at the right or left side of the array, with the select lines now running vertically and the select scanners along the top or bottom of the array.

This embodiment, which can be realized by a simple 90 degree rotation of the chip containing the array, may be advantageous, as it would lead to the shuttering and readout operations running horizontally across the array, instead of vertically moving across the array (as presently described). The potential advantage of horizontal operation of the shutter/readout is that it would minimize temporal aliasing caused by the sweep of the exposed area across the array. Most image motion in natural subjects is horizontal, e.g., people walking, cars driving by. Horizontal shutter sweep exposes a vertical strip of the moving subject simultaneously, so the exposed image is not sheared.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. A method of operating an imaging array composed of a plurality of capacitively coupled bipolar active pixels arranged into rows and columns, comprising:

selecting a row of the array for reading out integrated charge of the pixels in the row;

resetting a sense amplifier connected to each column of the array;

applying an overflow pulse during the sense amplifier reset to a row of the array other than the selected row;

enabling the sense amplifiers connected to each column of the array;, applying a readout pulse to the selected row of the array; and sensing the integrated charge readout of each pixel in the selected row.

2. The method of claim 1, wherein the step of applying an overflow pulse to a row of the array other than the selected row further comprises:

applying the overflow pulse to every row of the array other than the selected row.

3. The method of claim 1, wherein the step of applying an overflow pulse to a row of the array other than the selected row further comprises:

applying the overflow pulse to every row of the array.

4. The method of claim 1, wherein a capacitance of a row select line coupled to a row of pixels in the array is C, and further, wherein an amplitude $V_{ov}$ of the overflow pulse is chosen to satisfy the relationship $$V_{ov} \geq (Q/C),$$

where Q is an amount of charge integrated on a pixel during a time required to readout a row of the array.

5. The method of claim 1, wherein a capacitance of a row select line coupled to a row of pixels in the array is C, the number of rows in the array is N, $Q_{tot}$ is the total amount of charge integrated on a pixel during a time required to readout the entire array, and $V_{ro}$ is an amplitude of a pulse applied to readout a row of the array, and further, wherein an amplitude $V_{ov}$ of the overflow pulse is chosen to satisfy the relationship $$V_{ov} \geq (1/N) [(Q_{tot}/C) - V_{ro}].$$

6. A method of operating an imaging array composed of a plurality of capacitively coupled bipolar active pixels arranged into rows and columns, comprising:

selecting a row of the array for reading out integrated charge of the pixels in the row;

resetting a sense amplifier connected to each column of the array;

applying a shutter pulse during the sense amplifier reset to a row of the array other than the selected row, the shutter pulse resetting each pixel in the row of the array to which it is applied;

enabling the sense amplifiers connected to each column of the array;

applying a readout pulse to the selected row of the array; and sensing the charge readout of each pixel in the selected row.

7. The method of claim 6, wherein the array has N rows and each sense amplifier is reset N times during readout of all of the rows of the array, and further, wherein the shutter pulse is applied to the row of the array other than the selected row once during each of N-M times each sense amplifier is reset, where M is an integer $\geq 1$ and the pixels in the selected row integrate for M line-times prior to application of the readout pulse.

8. The method of claim 7, wherein the step of applying the shutter pulse during the sense amplifier reset to the row of the array other than the selected row further comprises:

applying the shutter pulse to every row of the array other than the M rows sequentially following the selected row.

9. A method of operating an imaging array composed of a plurality of capacitively coupled bipolar active pixels arranged into rows and columns, comprising:

focusing an image on the imaging array;

selecting a row of the array for reading out integrated charge of the pixels in the row;

resetting a sense amplifier connected to each column of the array;

applying an overflow pulse during the sense amplifier reset to each row of the array;

enabling the sense amplifiers connected to each column of the array;

applying a readout pulse to the selected row of the array;

sensing the charge readout of each pixel in the selected row; and repeating the above steps until each row of the imaging array is readout.

10. The method of claim 9, wherein the step of applying an overflow pulse to each row of the array further comprises applying the overflow pulse to a first subset of the rows of the array, and the method further comprises the step of:

applying a shutter pulse to a second subset of the rows of the array during the sense amplifier reset, the second subset not intersecting with the first subset and the shutter pulse resetting each pixel in the rows of the array to which it is applied.

11. The method of claim 9, wherein a capacitance of a row select line coupled to a row of pixels in the array is C and further, wherein an amplitude $V_{ov}$ of the overflow pulse is chosen to satisfy the relationship $$V_{ov} \geq (Q/C),$$

where Q is an amount of charge integrated on a pixel during a time required to readout a row of the array.

12. The method of claim 9, wherein a capacitance of a row select line coupled to a row of pixels in the array is C, the number of rows in the array is N, $Q_{tot}$ is the total amount of charge integrated on a pixel during a time required to readout the entire array, and $V_{ro}$ is an amplitude of a pulse applied to readout a row of the array, and further, wherein an amplitude $V_{ov}$ of the overflow pulse is chosen to satisfy the relationship $$V_{ov} \geq (1/N)[(Q_{tot}/C) - V_{ro}].$$

13. The method of claim 9, wherein instead of the step of applying an overflow pulse during the sense amplifier reset to each row of the array, the method comprises:

applying an overflow pulse during the sense amplifier reset to each column of the array.

14. An imaging array, comprising:

a plurality of photosensors arranged in an array of horizontal rows and vertical columns, wherein each photosensor is a bipolar, capacitively coupled phototransistor;

a plurality of sense amplifiers, with one sense amplifier being electrically connected to each column of the array;

a first selector which applies a row readout pulse to a selected row of the array during a sensing phase of the sense amplifiers; and a second selector which applies an overflow pulse to each row of the array during a reset phase of the sense amplifiers.

15. The imaging array of claim 14, wherein the second selector applies the overflow pulse to a first subset of the rows of the array and applies a shutter pulse to a second subset of the rows of the array during the sense amplifier reset phase, the second subset not intersecting with the first subset, and the shutter pulse resetting each pixel in the rows of the array to which it is applied.

16. An imaging array, comprising:

a plurality of photosensors arranged in an array of horizontal rows and vertical columns, wherein each photosensor is a bipolar, capacitively coupled phototransistor;

a plurality of sense amplifiers, with one sense amplifier being electrically connected to each row of the array;

a first selector which applies a column readout pulse to a selected column of the array during a sensing phase of the sense amplifiers; and a second selector which applies an overflow pulse to each column of the array during a reset phase of the sense amplifiers.

17. The imaging array of claim 16, wherein the second selector applies the overflow pulse to a first subset of the columns of the array and applies a shutter pulse to a second subset of the columns of the array during the sense amplifier reset phase, the second subset not intersecting with the first subset and the shutter pulse resetting each pixel in the columns of the array to which it is applied.

* * * * *